July 27, 1954
C. W. MOORE
2,684,832
AUTOMOBILE ELEVATING MECHANISM
Filed Nov. 4, 1952
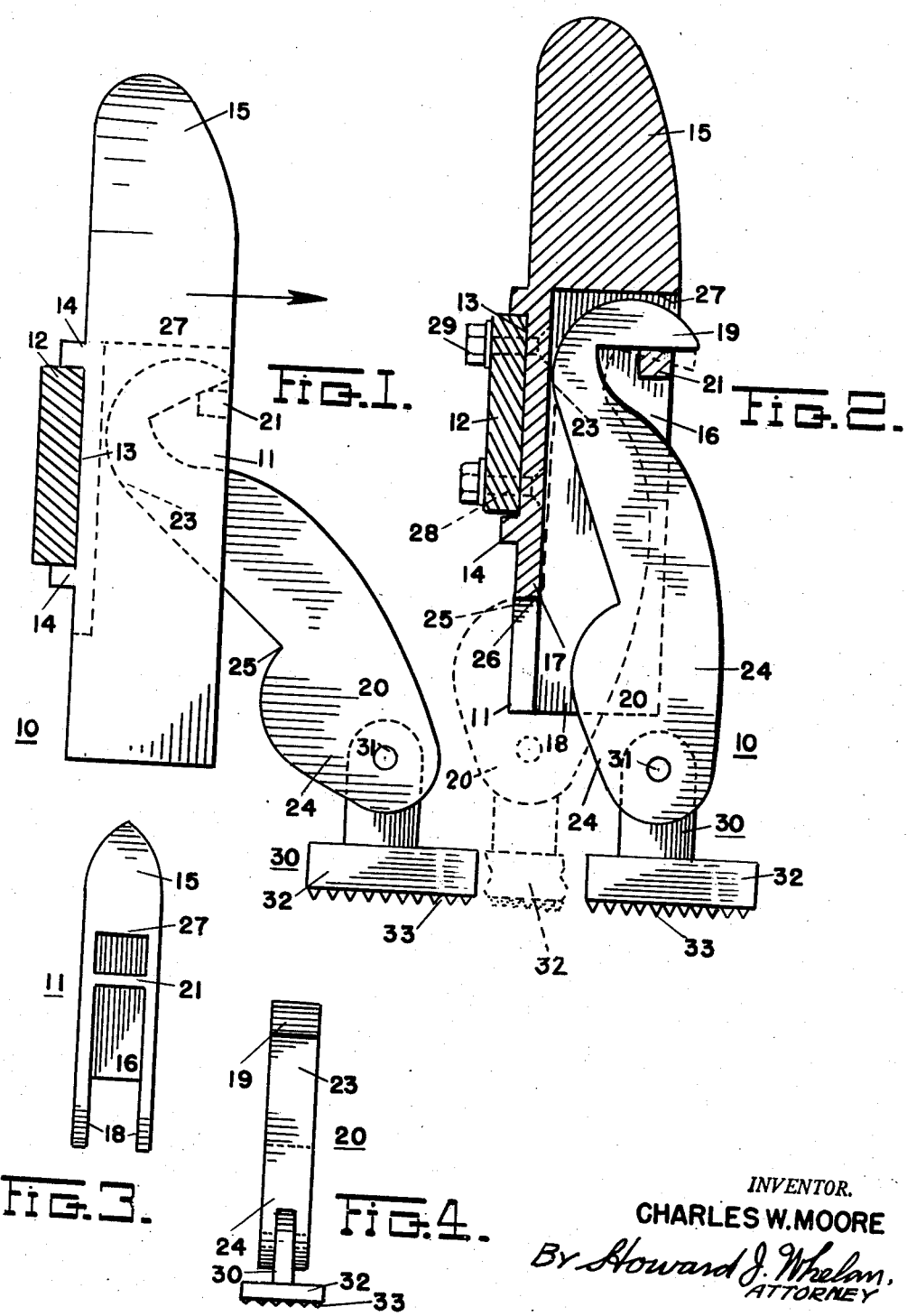
INVENTOR.
CHARLES W. MOORE
By Howard J. Whelan,
ATTORNEY Patented July 27, 1954

2,684,832

UNITED STATES PATENT OFFICE 2,684,832

AUTOMOBILE ELEVATING MECHANISM

Charles W. Moore, Annapolis, Md.

Application November 4, 1952, Serial No. 318,569

2 Claims. (Cl. 254—86)

This invention relates to mechanisms for elevating the wheels of a vehicle off the ground, and more particularly to a type attachable to the bumper or framework of a vehicle such as an automobile and operated through the use of the momentum or propelling power of the vehicle.

The use of jacks of some kind are customarily employed for raising automobiles and other vehicles off the ground so the wheels or tires can be repaired as needed. This work is more or less tedious and requires manual labor to accomplish it. It is further objectionable because of the effort involved in the handling of the jack and its tendency to slip and drop the auto off the jack, and dirty the hands and clothes of the operator. In this invention, the use of a jack is avoided in connection with an automobile or the like by the use of a simple device having few components and capable of being operated by the momentum or power of the vehicle. It consists of a shell or headpiece of particular form, securely fastened to the bumper or chassis of a vehicle and left in position permanently. Another element of a particular arcuate contour slips into the shell when required, that serves to raise the vehicle when the latter is propelled longitudinally. This raising enables the wheels adjacent to the device, to be worked on, because they are raised free of the ground. In connection with a conventional automobile, the device finds its most frequent employment in changing or mounting tires, but it may be used for other work where the raising of a particular part of the vehicle is desirable or necessary.

The invention has for an object the provision of a new and improved elevating device for vehicles that will avoid one or more of the limitations and disadvantages of the prior art.

Another object of the invention is to provide a new and improved elevating device for a vehicle that will do the work of raising the latter through the use of the momentum or propelling power of the vehicle.

Still another object of the invention is to provide a new and improved elevating device for a motor driven vehicle that will use the propelling power of the vehicle to operate the device and induce it to raise one or more of its wheels to a height above the ground to allow working on them.

A further object of the invention is to provide a new and improved elevating device for a motor vehicle that will be in part permanently attached to its bumper or chassis, while another component is free but readily inserted and positioned in the first part when the device is to be utilized.

An additional object of the invention is to provide a new and improved elevating unit for the wheels of a vehicle that is simple in construction, economical to manufacture, takes up little space and when attached requires little physical effort, while at the same time it can be operated by power derived from the movement of the vehicle in a predetermined direction over the ground.

For a general understanding of the invention, its objects and principles, reference is made to the accompanying drawings wherein a form of the invention is shown by way of example. A description of the drawings is included herein to illustrate the operation and general structure of the device, while the claims emphasize the scope of the invention.

Referring to the drawings:

Figure 1 is a sectional side elevation of an elevating unit embodying this invention, the position shown being that taken when the device is ready for operation;

Figure 2 is a similar view with portions of the unit broken away to show the interior construction and the positions of the parts while being raised;

Figure 3 is a front view in elevation of the head piece used in this embodiment; and Figure 4 is a front elevation of the toggle element used in this embodiment.

Similar reference characters refer to similar parts throughout the drawings.

The invention is presented in this specification in the form of a lifting unit for use with a motor vehicle having bumpers, to which it can be attached. The unit 10 consists of a head piece 11 having a rounded form suitable for mounting on the front of an automobile bumper 12. Its rear face 13 is designed to fit the vertical contour of the bumper and flanges 14 are provided to engage over the edges thereof. These flanges align the head piece at right angles to the horizontal axis of the bumper and keep it from getting out of position. The upper portion or cap 15 of the head piece 11 is made of suitable length and rounded shape to serve as a guard for the bumper and prevent it from entangling with the bumper of another automobile in case of a collision or contact. Below the portion 15 is a hollow space 16 arranged with three flat and straight walls 17 and 18 encompassing it. These walls form the rear 17 and side walls 18 of the cap and make the interior of a quasi-channel shape. The open front of the cap is spanned by a cross-piece 21 spaced from the solid guard top 15 a sufficient distance for the hook 19 of an interlocking toggle element 20, to engage and slide around. The cross-piece 21 is also spaced from the rear wall 17 an amount that will allow the arcuate neck 23 of the element 20 to move through and in its final position come to rest against this wall. The lower portion or base 24 of the element is enlarged as shown in the drawings to form a rearwardly extended ledge 25 that slides through a window opening in the wall 17 and presses against the lower edge 26 of the head piece and supports it, while the upper surface of the hook 19 cooperates in this action by its support of the surface or roof 27. The cross piece 21 is made of limited width to provide a passage in back of it to the rear wall 17. The surface 27 under the cap or roof 15 forms a resting surface for the exterior arcuate surface on the hook 19 to press against while the element 20 is being raised. The head piece is secured firmly to the bumper by means of countersunk bolts 28 and nuts 29. These bolts in conjunction with the flanges 14 of the head piece keep the head piece in a vertical position capable of withstanding the stresses involved in jacking up the bumper and auto.

The base 24 of the toggle element 20 is enlarged and bifurcated to straddle over a foot bracket 30 which has a short shaft 31 journalled in it. The bracket 30 has a flat rectangular foot member 32 faced with corrugations or checkered knurlings 33 to make it resistant to slipping on the ground. The toggle element is separable from the head piece when not used for jacking purposes. The term knurling is intended to cover any roughened surface adapted to prevent slipping over the ground.

In the use of the device, the head piece and guard is rigidly attached to the bumper 12 in a permanent manner. The toggle element 20 is inserted with its hook 19 in the space 16 and pushed in, in an angular and arcuate path until the upper surface of the cross-piece 21 is engaged by the under side of the upper face of the hook 19 which contacts the roof 27. The position of the device when this is done is indicated in Figures 1 and 2. The automobile with the bumper 12 carrying the unit is propelled forward. As it travels forward the toggle element 20 is held by the ground as its bracket 30 resists the movement. The base 24 of the toggle element likewise resists movement but allows its hook and neck 23 portion to rotate on the shaft 31. As the element so rotates forward it is being pushed by the headpiece 11 as the bumper carries it along, its hook is moved through an arc raising it to a point several inches above its original position in the unit. This raises the head piece and incidently the bumper 12 and the front wheels of the automobile. The position of the unit is as indicated in Figure 2, in full outline, but it can be moved over further as shown in the dotted outline, until the ledge 25 makes contact with the edge 26 and becomes stationary. The foot member 32 is extended in front far enough to provide a support that will prevent the unit from tilting forward, and putting an excessive stress upon it. To lower the unit or its toggle element, the automobile is propelled in reverse and rotates the toggle element until it disengages itself and can be removed.

The device has a number of important features. It is simple in structure, having two main components, the head piece and the toggle member. The head piece 11 being permanently attached, eliminates most of the trouble which the usual jack requires in placing it under a vehicle to jack its wheels up. The device can be made artistic and relatively inconspicuous. The removable toggle is easily handled and stored. In the use of the device the labor of raising the unit is avoided, since the heavy work is done by the propelled vehicle. The bumper can be used to carry two of the units at a time, although one or two may be employed on an occasion. Its cost of manufacture can be kept down to a reasonable basis. Further the use of an extended cap on the head piece makes the need for the conventional bumper guard unnecessary, while at the same time forming a handle for the user to grasp while he is bending over the unit during the placement of the toggle element.

While but one form of the invention is shown in the drawing, it is not desired to limit this application for Letters Patent to this particular form, as it is appreciated that other constructions could be used that would employ the same principles and come within the scope of the appended claims.

Having thus described the invention, what is claimed is:

1. A jack for a vehicle having a bumper attached thereto, comprising a headpiece having a back wall, two parallel side walls extending therefrom and a horizontal wall connecting the upper ends of the back wall and the side walls, said walls forming a chamber open at its bottom and at its front, means for securing said headpiece to the bumper, a cross piece connecting the side walls near the upper end of the chamber, said cross piece being spaced from the horizontal wall, a toggle element separate and independent from the headpiece, said element having an upper hook portion adapted to slip over the cross piece, said hook portion having an outer face portion adapted to contact the horizontal wall, a straight face portion extending downwardly from the outer face portion and an enlarged portion adjoining said straight face portion, said last two mentioned portions forming a ledge at their point of junction, and a foot bracket pivoted to the lower end of the headpiece, said bracket having a flat face engageable with the ground, whereby, upon forward movement of the vehicle, the head piece pivots about the cross piece until the straight face portion of the toggle element abuts the back wall of the headpiece and the vehicle is raised and supported by contact of the outer face portion of the hook portion with the aforesaid horizontal wall of the headpiece, the vehicle being kept further in locked raised position by engagement of the back wall of the headpiece with the aforesaid ledge.

2. A jack as set forth in claim 1 including a pair of spaced flanges extending outwardly of the back wall of the headpiece and straddling the bumper.

References Cited in the file of this patent

UNITED STATES PATENTS

| Number | Name | Date |
| --- | --- | --- |
| 1,091,390 | Riopel | Mar. 24, 1914 |
| 1,680,228 | Marty | Aug. 7, 1928 |
| 2,343,459 | Hines | Mar. 7, 1944 |